(12) United States Patent
Williams et al.

(10) Patent No.: US 12,268,988 B2
(45) Date of Patent: Apr. 8, 2025

(54) HVAC SYSTEM AIR FILTER

(71) Applicant: K&N Engineering, Inc., Riverside, CA (US)

(72) Inventors: Steve Williams, Cherry Valley, CA (US); Jere James Wall, Helendale, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 18/408,380

(22) Filed: Jan. 9, 2024

(65) Prior Publication Data

US 2024/0139674 A1    May 2, 2024

Related U.S. Application Data

(63) Continuation of application No. 17/516,127, filed on Nov. 1, 2021, now abandoned, which is a
(Continued)

(51) Int. Cl.
| | | |
|---|---|---|
| *B01D 53/32* | (2006.01) |
| *B01D 39/08* | (2006.01) |
| *B01D 41/04* | (2006.01) |
| *B01D 46/79* | (2022.01) |
| *B01D 53/04* | (2006.01) |
| *B03C 3/017* | (2006.01) |

(Continued)

(52) U.S. Cl.
CPC ......... *B01D 53/323* (2013.01); *B01D 39/083* (2013.01); *B01D 41/04* (2013.01); *B01D 53/0407* (2013.01); *B03C 3/017* (2013.01); *B03C 3/155* (2013.01); *B03C 3/41* (2013.01); *B03C 3/47* (2013.01); *F24F 8/125* (2021.01); *B01D 46/79* (2022.01); *B01D 2257/708* (2013.01)

(58) Field of Classification Search
CPC   B01D 46/0035; B01D 53/323; B01D 39/083; B01D 46/79; B01D 2257/708; F24F 8/125; B03C 3/155; B03C 3/017; B03C 3/41; B03C 3/47
See application file for complete search history.

(56) References Cited

U.S. PATENT DOCUMENTS

| | | | | |
|---|---|---|---|---|
| 2003/0106293 A1* | 6/2003 | Tanaka | ............... | F02M 35/026 |
| | | | | 55/482 |
| 2010/0227545 A1* | 9/2010 | Frois | .................... | F24F 13/085 |
| | | | | 55/495 |

* cited by examiner

*Primary Examiner* — Robert Clemente
(74) *Attorney, Agent, or Firm* — Rutan & Tucker LLP; Hani Z. Sayed

(57) ABSTRACT

An apparatus and a method are provided for a heating, ventilation, and air conditioning (HVAC) system air filter for a building ventilation system. The HVAC system air filter comprises a supportive frame configured to orient the HVAC system air filter within the building ventilation system. A composite filter medium retained within the supportive frame comprises a cotton gauze portion and an electrostatic portion. The cotton gauze portion is configured for treatment with a filter oil composition to enhance airflow and filtration of air flowing through the composite filter medium. The electrostatic portion is configured to electrostatically attract and agglomerate airborne molecular contaminants and volatile organic compounds (VOCs) as small as 0.001 microns in diameter. In some embodiments, the composite filter medium comprises substances configured to release a fragrance into air passing through the composite filter medium.

19 Claims, 4 Drawing Sheets

Related U.S. Application Data continuation of application No. 16/514,954, filed on Jul. 17, 2019, now Pat. No. 11,161,074, which is a continuation of application No. 14/974,092, filed on Dec. 18, 2015, now Pat. No. 10,434,466, which is a continuation of application No. 14/668,772, filed on Mar. 25, 2015, now Pat. No. 9,701,178.

(51) Int. Cl.
*B03C 3/155* (2006.01)
*B03C 3/41* (2006.01)
*B03C 3/47* (2006.01)
*F24F 8/125* (2021.01)

FIG. 6
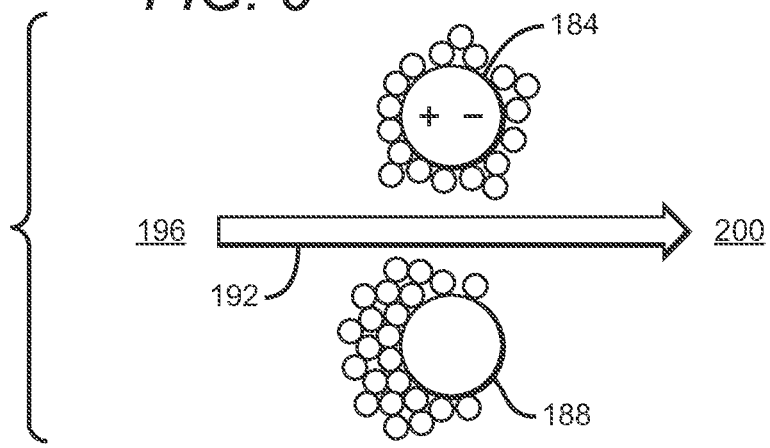
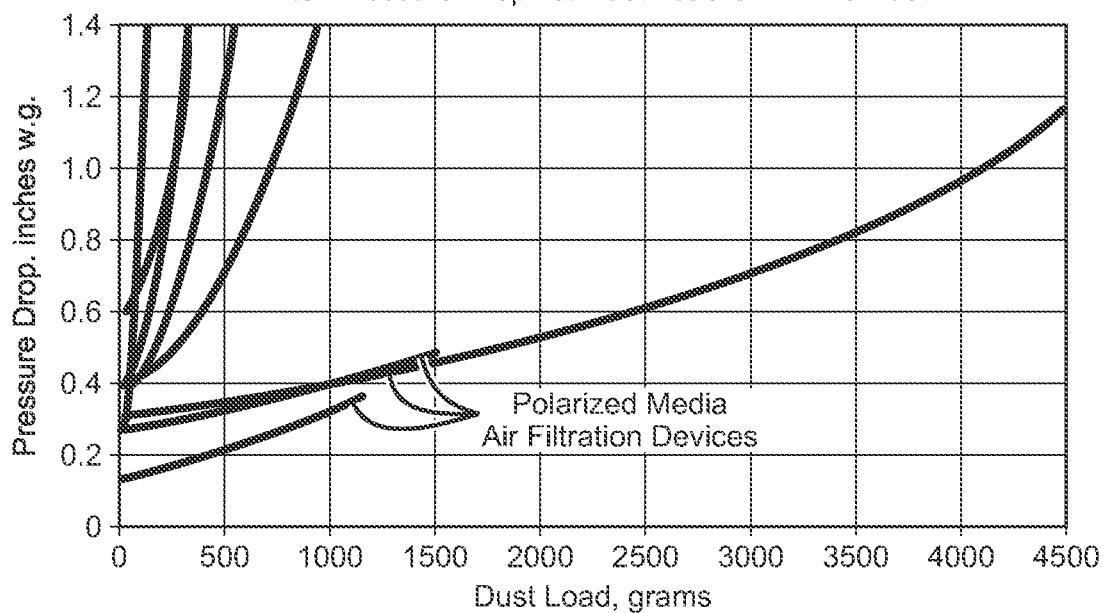
Loading Comparisons
All Filters are 24" x 24" Tested at 500FPM Through Face Area
FIG. 7

HVAC SYSTEM AIR FILTER

PRIORITY

This continuation application claims the benefit of and priority to U.S. patent application Ser. No. 17/516,127 filed on Nov. 1, 2021, which claims the benefit of and priority to U.S. patent application Ser. No. 16/514,954 filed on Jul. 17, 2019 and U.S. patent application Ser. No. 14/974,092 filed on Dec. 18, 2015, now issued U.S. Pat. No. 10,434,466 and U.S. patent application, entitled "Cabin Air Filter," filed on Mar. 25, 2015 having application Ser. No. 14/668,772, now issued U.S. Pat. No. 9,701,178.

FIELD

The field of the present disclosure generally relates to filter devices. More particularly, the field of the invention relates to an apparatus and a method for a HVAC system air filter to remove airborne molecular contaminants and volatile organic compounds from air within interior building spaces.

BACKGROUND

Heating, ventilation, and air conditioning (HVAC) systems generally operate to provide optimal indoor air quality to occupants within interior building spaces. HVAC systems achieve optimal indoor air quality by conditioning air, removing particle contaminants by way of ventilation and filtration of air, and providing proper building pressurization.

While there are many different HVAC system designs and operational approaches, and each building design is unique, HVAC systems generally share a few basic design elements. For example, outside air ("supply air") generally is drawn into a HVAC system of a building through an air intake. Once in the HVAC system, the supply air is filtered to remove particle contaminants, then heated or cooled, and then circulated throughout the building by way of an air distribution system. Many air distribution systems comprise a return air system configured to draw air from interior building spaces and return the air ("return air") to the HVAC system. The return air is then mixed with supply air and then filtered, conditioned, and circulated throughout the building. Often times, a portion of the air circulating within the building may be exhausted to the exterior of the building so as to maintain a desired barometric pressure within the building.

As will be appreciated, the effectiveness of the HVAC system to provide an optimal indoor air quality depends largely on an ability of an air filter within the HVAC system to remove particle contaminants from the air within the building. A HVAC system air filter typically comprises fibrous materials configured to remove solid particulates, such as dust, pollen, mold, and bacteria from the air passing through the HVAC system. A drawback to conventional HVAC system air filters, however, is that highly effective air filters capable of removing very small contaminants, such as airborne molecular contaminants and volatile organic compounds (VOCs), tend to restrict airflow through the air filter, thereby making the HVAC system work harder and consume more energy.

Another drawback to conventional HVAC system air filters is that dirty or clogged air filters typically are removed from the HVAC system and discarded, and a new HVAC system air filter is then installed. Further, HVAC system air filters may be unnecessarily discarded and replaced in an effort to increase HVAC system airflow and thus decrease operation costs. Considering that there are millions of buildings with HVAC systems throughout the world, the volume of discarded air filters that could be eliminated from landfills is a staggering number. What is needed, therefore, is a HVAC system air filter which may be periodically cleaned and reused, and is configured for removing airborne molecular contaminants and VOCs without obstructing air flow through HVAC systems.

SUMMARY

An apparatus and a method are provided for a heating, ventilation, and air conditioning (HVAC) system air filter for a building ventilation system. The HVAC system air filter comprises a supportive frame configured to suitably orient the HVAC system air filter within the building ventilation system. In some embodiments, a filter medium retained within the supportive frame comprises a cotton gauze portion and an electrostatic portion. The cotton gauze portion comprises at least one layer of cotton gauze configured for treatment with a filter oil composition to enhance airflow and filtration of air flowing through the filter medium. In some embodiments, the filter oil composition comprises a first portion comprising paraffinic oil by volume of the composition, a second portion comprising polyalphaolefin (PAO) by volume of the composition, and a third portion comprising red dye by volume of the composition. The electrostatic portion is configured to electrostatically attract and agglomerate airborne molecular contaminants and volatile organic compounds (VOCs) within air flowing through the building ventilation system. In some embodiments, a positively charged central screen and one or more layers of polarizable fibers entrap particle contaminants within the layers of polarizable fibers. In some embodiments, the electrostatic portion comprises at least some fibers that are treated with a coating of positively charged molecules configured to electrostatically capture and destroy negatively charged microbes and volatile organic compounds as small as 0.001 microns in diameter. In some embodiments, the filter medium comprises substances configured to release a fragrance into air passing through the filter medium. The substances generally are located downstream of the electrostatic portion so as to avoid destruction of aromatic molecules by the electrostatic portion.

In an exemplary embodiment, a heating, ventilation, and air conditioning (HVAC) system air filter to remove airborne molecular contaminants and volatile organic compounds (VOCs) from air within building spaces, comprising: a supportive frame comprising a shape and size suitable for orienting the HVAC system air filter within a HVAC system of a building; and a filter medium retained within the supportive frame and configured to remove the airborne molecular contaminants and volatile organic compounds from air flowing through the HVAC system.

In another exemplary embodiment, the filter medium comprises a cotton gauze portion comprising at least one layer of cotton gauze disposed between two epoxy-coated aluminum wire screens, the at least one layer of cotton gauze being suitable for treatment with a filter oil composition to cause tackiness of microscopic fiber strands comprising the filter medium. In another exemplary embodiment, the filter oil composition comprises a first portion comprising paraffinic oil by volume of the composition, a second portion comprising polyalphaolefin (PAO) by volume of the composition, and a third portion comprising red dye by volume of the composition.

In another exemplary embodiment, an electrostatic portion of the filter medium is configured to electrostatically attract and agglomerate particle contaminants within the air flowing through the HVAC system. In another exemplary embodiment, the electrostatic portion of the filter medium comprises a central screen configured to be electrically charged, the central screen being covered on each side by at least one layer of fibers capable of being electrically polarized, each of the at least one layer of fibers being covered by a grounded wire screen, wherein upon positively charging the central screen the at least one layer of fibers polarizes particle contaminants within the air flowing through the HVAC system, thereby causing the contaminants to be electrostatically entrapped within the at least one layer of fibers. In another exemplary embodiment, the electrostatic portion of the filter medium comprises at least some fibers that are treated with a coating of antimicrobial molecules configured to destroy microbes, the antimicrobial molecules comprising positively charged molecules distributed around the entire circumference of each of the at least some fibers and configured to cooperate with polarized fibers within the filter medium. In another exemplary embodiment, the positively charged molecules are configured to electrostatically capture negatively charged microbes and volatile organic compounds as small as substantially 0.001 microns in diameter within the air flowing through the HVAC system. In another exemplary embodiment, the filter medium is configured to electrostatically entrap particle contaminants and release a fragrance into the air flowing through the ventilation system, the filter medium comprising antimicrobial molecules configured to destroy entrapped particle contaminants, the filter medium comprising at least one substance configured to release the fragrance into air passing through the filter medium, wherein the at least one substance is located downstream of the antimicrobial molecules so as to avoid destruction of aromatic molecules by the antimicrobial molecules.

In an exemplary embodiment, a heating, ventilation, and air conditioning (HVAC) system air filter for a building ventilation system, comprising: a supportive frame configured to suitably orient the HVAC system air filter within the building ventilation system; and a composite filter medium comprising a cotton gauze portion and an electrostatic portion configured to electrostatically attract and agglomerate airborne molecular contaminants and volatile organic compounds (VOCs) within air flowing through the building ventilation system, the composite filter medium being retained within the supportive frame.

In another exemplary embodiment, the electrostatic portion comprises a positively charged central screen, the central screen being covered on each side by at least one layer of polarized fibers, each of the at least one layer of polarized fibers being covered by a grounded wire screen, wherein the positively charged central screen and the at least one layer of fibers polarizes particle contaminants within the air flowing through the building ventilation system, thereby entrapping the particle contaminants within the at least one layer of polarizable fibers. In another exemplary embodiment, the electrostatic portion comprises at least some fibers that are treated with a coating of positively charged molecules configured to electrostatically capture and destroy negatively charged microbes and volatile organic compounds as small as substantially 0.001 microns in diameter within the air flowing through the building ventilation system.

In another exemplary embodiment, the composite filter medium comprises at least one substance configured to release a fragrance into air passing through the composite filter medium, wherein the at least one substance is located downstream of the electrostatic portion so as to avoid destruction of aromatic molecules by the electrostatic portion. In another exemplary embodiment, the cotton gauze portion comprises at least one layer of cotton gauze configured for treatment with a filter oil composition to enhance airflow and filtration of air flowing through microscopic fiber strands comprising the composite filter medium. In another exemplary embodiment, the filter oil composition comprises a first portion comprising paraffinic oil by volume of the composition, a second portion comprising polyalphaolefin (PAO) by volume of the composition, and a third portion comprising red dye by volume of the composition.

In an exemplary embodiment, a method for cleaning a heating, ventilation, and air conditioning (HVAC) system air filter which is installed within a HVAC system of a building, the method comprising: removing the HVAC system air filter from the HVAC system; clearing the HVAC system of any debris trapped therein; flushing contaminants from a filter medium of the HVAC air filter by way of a water hose; allowing the water and contaminants to drain from the filter medium; and allowing the filter medium to dry.

In another exemplary embodiment, the filter medium comprises a cotton gauze portion comprising at least one layer of cotton gauze configured for treatment with a filter oil composition comprising a first portion comprising paraffinic oil by volume of the composition, a second portion comprising polyalphaolefin (PAO) by volume of the composition, and a third portion comprising red dye by volume of the composition. In another exemplary embodiment, flushing contaminants from the filter medium further comprises using a solvent to remove a filter oil composition from a cotton gauze portion of the filter medium. In another exemplary embodiment, allowing the filter medium to dry further comprises uniformly applying a filter oil composition to a cotton gauze portion of the filter medium and allowing the filter oil composition to wick into the cotton gauze portion.

In an exemplary embodiment, a reusable air filter for building spaces, comprises: a filter medium for filtering air within a building; a frame for supporting the filter medium; and a filter oil composition for causing tackiness of the filter medium.

In another exemplary embodiment, the frame includes a shape and a size for orienting the filter medium within an HVAC system of the building. In another exemplary embodiment, the filter medium is configured to remove the airborne molecular contaminants and volatile organic compounds from the air. In another exemplary embodiment, the filter oil composition comprises any one or more of paraffinic oil, polyalphaolefin, and a dye. In another exemplary embodiment, the filter medium includes at least one substance configured to release a fragrance into the air.

In another exemplary embodiment, the filter medium includes a cotton gauze portion and an electrostatic portion. In another exemplary embodiment, the electrostatic portion is configured to attract and agglomerate particle contaminants from the air. In another exemplary embodiment, the electrostatic portion includes a central screen covered on each side by at least one layer of polarizable fibers. In another exemplary embodiment, the electrostatic portion comprises fibers that are treated with a coating of antimicrobial molecules configured to destroy microbes. In another exemplary embodiment, the cotton gauze portion includes at least one layer of cotton gauze disposed between two wire screens.

In another exemplary embodiment, the at least one layer of cotton gauze is configured to be treated with the filter oil composition. In another exemplary embodiment, the filter oil composition is configured to wick into the at least one layer of cotton gauze. In another exemplary embodiment, the at least one layer of cotton gauze is configured to be flushed free of the filter oil composition and contaminants. In another exemplary embodiment, the filter oil composition is configured to be washed from the filter medium. In another exemplary embodiment, the filter oil composition is configured to be flushed from the filter medium along with entrapped contaminants by way of a solvent and water.

In another exemplary embodiment, the filter oil composition comprises a mixture for causing tackiness of the filter medium. In another exemplary embodiment, the mixture comprises any two or more of paraffinic oil, polyalphaolefin, and a dye. In another exemplary embodiment, the mixture comprises about 96.74% paraffinic oil, by volume, about 3.20% polyalphaolefin, by volume, and about 0.06% red dye, by volume. In another exemplary embodiment, the filter oil composition is configured to capture particle contaminants having sizes that are much smaller than the openings between fibers comprising the filter medium. In another exemplary embodiment, the filter oil composition is configured to capture contaminants throughout the volume of the filter medium.

These and other features of the concepts provided herein may be better understood with reference to the drawings, description, and appended claims.

BRIEF DESCRIPTION OF THE DRAWINGS

The drawings refer to embodiments of the present disclosure in which:

FIG. 6 illustrates cross-sectional views of an exemplary embodiment of a polarized fiber and an unpolarized passive fiber being exposed to particle contaminants within an air stream flowing from an upstream area to a downstream area; and FIG. 7 illustrates a graph showing an experimentally determined relationship between fine dust loading and a drop in pressure across each of several air filter devices.

Figure 1:
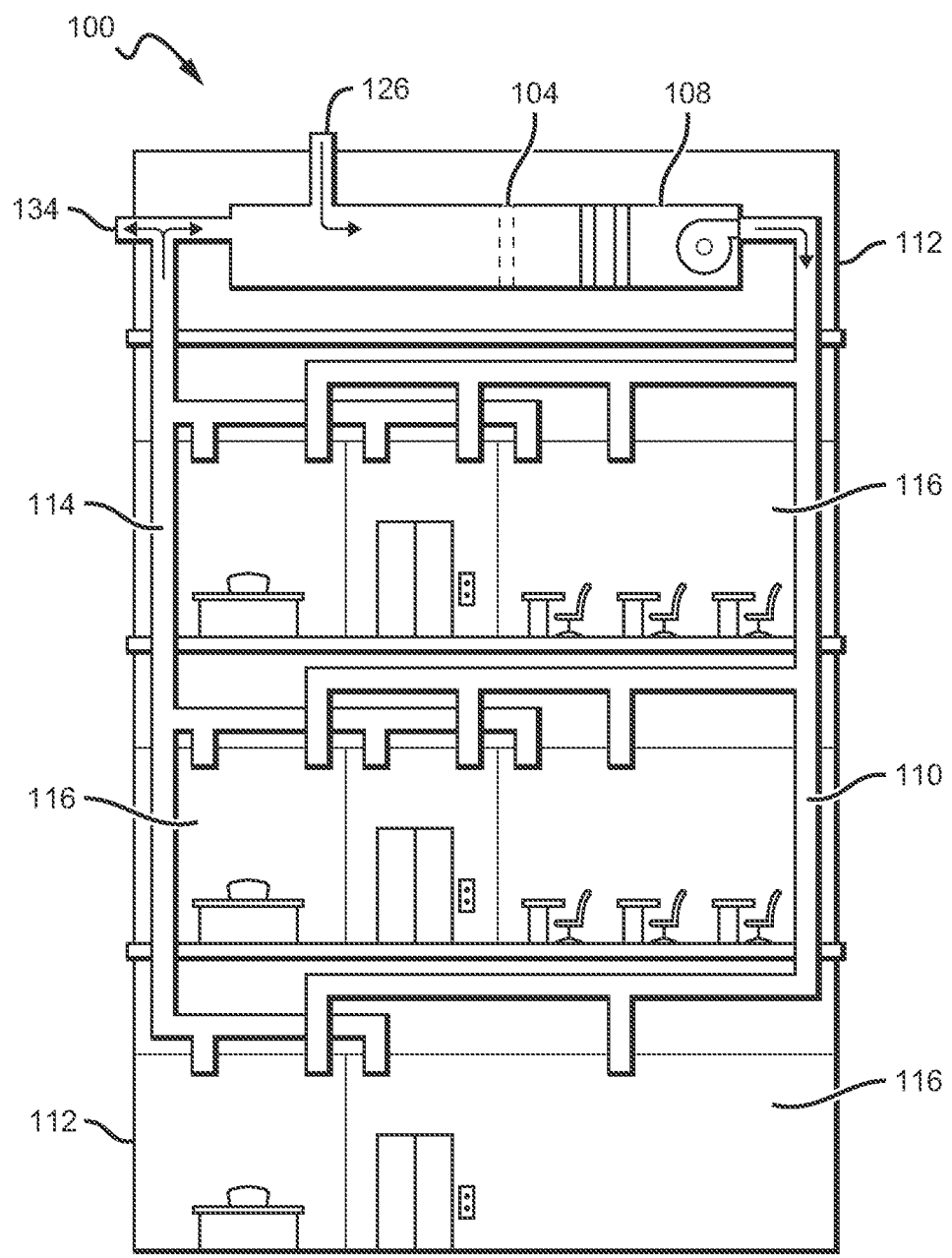
FIG. 1 illustrates a cross-sectional view of an exemplary use environment wherein a HVAC system air filter is incorporated into a HVAC system of a building, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first portion," may be made. However, the specific numeric reference should not be interpreted as a literal sequential order but rather interpreted that the "first portion" is different than a "second portion." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a heating, ventilation, and air conditioning (HVAC) system air filter to remove airborne molecular contaminants and volatile organic compounds (VOCs) from air within interior building spaces. The HVAC system air filter comprises a supportive frame having a shape and size suitable for orienting the HVAC system air filter within a HVAC system of a building. A filter medium retained within the supportive frame is configured to remove the airborne molecular contaminants and volatile organic compounds from air flowing through the HVAC system. The filter medium comprises a cotton gauze portion which includes one or more layers of cotton gauze disposed between two epoxy-coated aluminum wire screens. The layers of cotton gauze are suitable for treatment with a filter oil composition to cause tackiness of microscopic fiber strands comprising the filter medium. The filter oil composition preferably comprises a first portion comprising paraffinic oil by volume of the composition, a second portion comprising polyalphaolefin (PAO) by volume of the composition, and a third portion comprising red dye by volume of the composition. An electrostatic portion of the filter medium is configured to electrostatically attract and agglomerate particle contaminants within the air flowing through the HVAC system. In some embodiments, the electrostatic portion of the filter medium comprises a central screen configured to be electrically charged. The central screen is covered on each side by at least one layer of fibers capable of being electrically polarized. An exterior grounded wire screen covers the layers of polarizable fibers such that the layers of polarizable fibers are disposed between the central screen and the ground wire screen. Upon positively charging the central screen, the layers of fibers polarize particle contaminants within the air flowing through the HVAC system, thereby causing the contaminants to be electrostatically entrapped within the layers of polarizable fibers. In some embodiments, the electrostatic portion comprises at least some fibers that are coated with positively charged antimicrobial molecules configured to destroy microbes. The positively charged molecules are configured to electrostatically capture negatively charged microbes and volatile organic compounds as small as substantially 0.001 microns in diameter within the air flowing through the HVAC system. In some embodiments, the filter medium further comprises at least one substance configured to release a fragrance into the air flowing through the building ventilation system. The substance preferably is located downstream of the electrostatic portion and the antimicrobial molecules so as to avoid destruction of aromatic molecules by the antimicrobial molecules.

FIG. 1 illustrates an exemplary use environment 100 wherein a HVAC system air filter 104 is incorporated into a HVAC system 108 of a building 112 so as to clean an air stream drawn through the air filter 104. After passing through the HVAC system air filter 104, the air stream is routed into one or more building spaces 116 by way of a supply ductwork 110. Air within the building spaces 116 is routed back to the HVAC system 108 by way of a return ductwork 114. It will be appreciated that the building 112 may comprise multiple stories, each of which stores including one or more building spaces 116, as illustrated in FIG. 1, or may comprise a single story building, including but not limited to a detached residential home.

Figure 2:
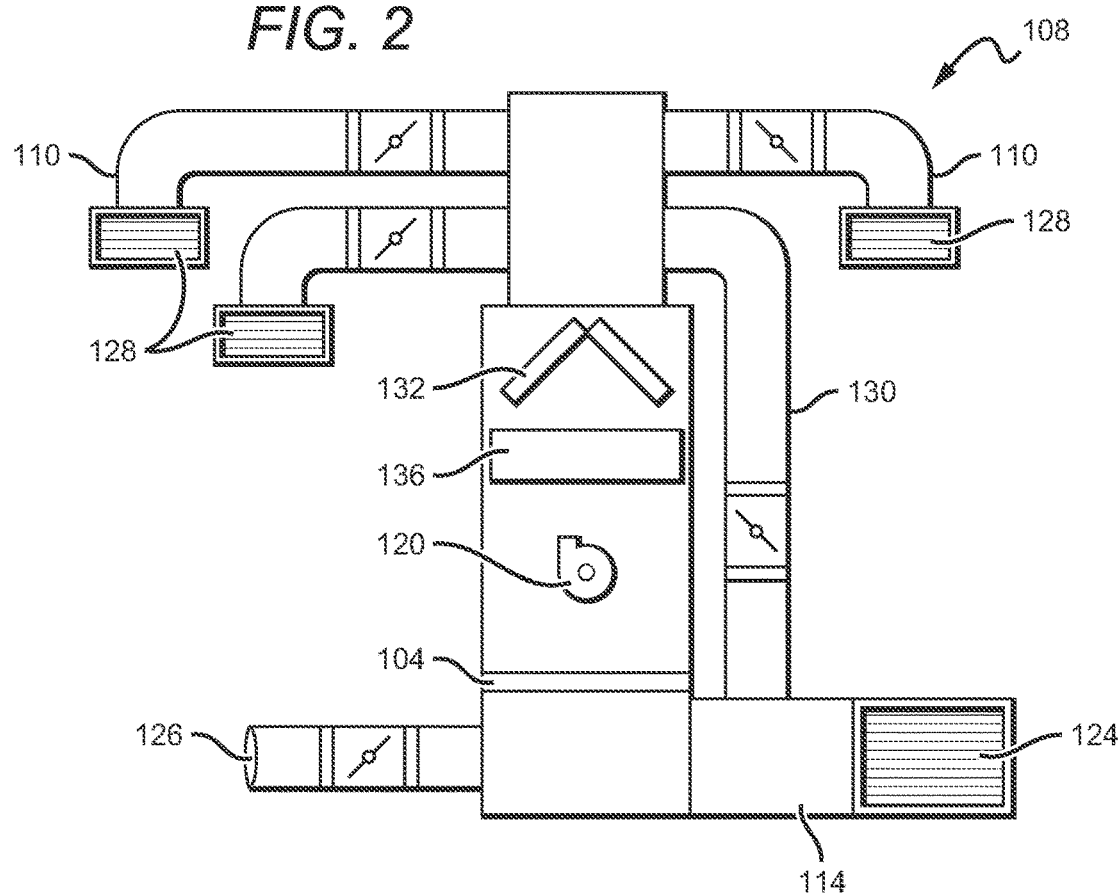
FIG. 2 illustrates a schematic view of an exemplary embodiment of a HVAC system comprising a HVAC system air filter in accordance with the present disclosure.

As shown in FIG. 2, the HVAC system 108 generally comprises a fan 120 configured to draw a return air stream 124 from the building spaces 116 through the HVAC system air filter 104 whereby airborne molecular contaminants, volatile organic compounds, and other particle contaminants are removed from the air stream. Particle contaminants removed from the return air stream 124 are entrapped in the HVAC system air filter 104. The fan 120 then pushes a clean air stream 128 through an air conditioning system 132 and a heater core 136 and then into the building spaces 116. As will be appreciated, the air conditioning system 132 and the heater core 136 facilitate providing a consistent, comfortable temperature within the building spaces 116 by respectively cooling and heating the clean air stream 128, as needed. As further shown in FIG. 2, the return air stream 124 may be combined with an outside air stream 126, as well as with a bypass air stream 130 air stream so as to maintain a desired barometric pressure within the HVAC system 108 and within the building spaces 116. In some embodiments, an exhaust air stream 134 may be further incorporated into the HVAC system 108 so as to maintain the desired barometric pressure and to allow entry of the outside air stream 126.

Figure 3:
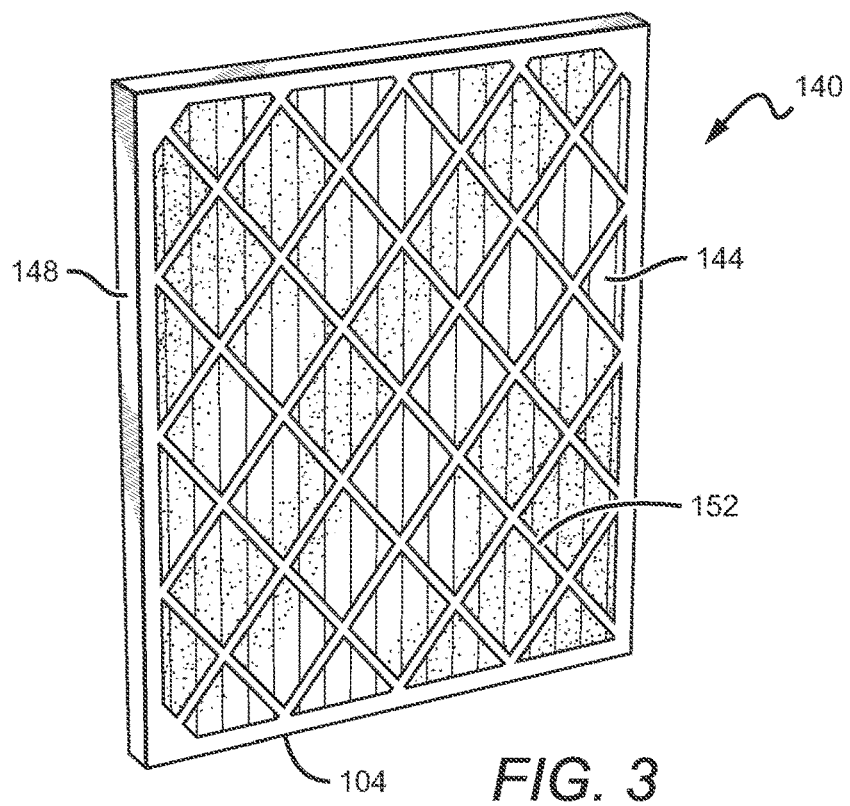
FIG. 3 illustrates an exemplary embodiment of a HVAC system air filter, according to the present disclosure.

FIG. 3 illustrates an exemplary embodiment 140 of a HVAC system air filter 104 according to the present disclosure. The HVAC system air filter 104 generally comprises a filter medium 144 within a supportive frame 148. The supportive frame 148 is configured to orient the HVAC system air filter 104 within the HVAC system 108 such that the return air stream 124 is directed through the filter medium 144. As such, the supportive frame 148 comprises a shape and size suitable for supporting the HVAC system air filter 104 within the HVAC system 108. It will be appreciated that the shape and size of the supportive frame 148 will vary depending upon a make and model of the HVAC system 108 for which the air filter 104 is intended to be used.

Figure 4:
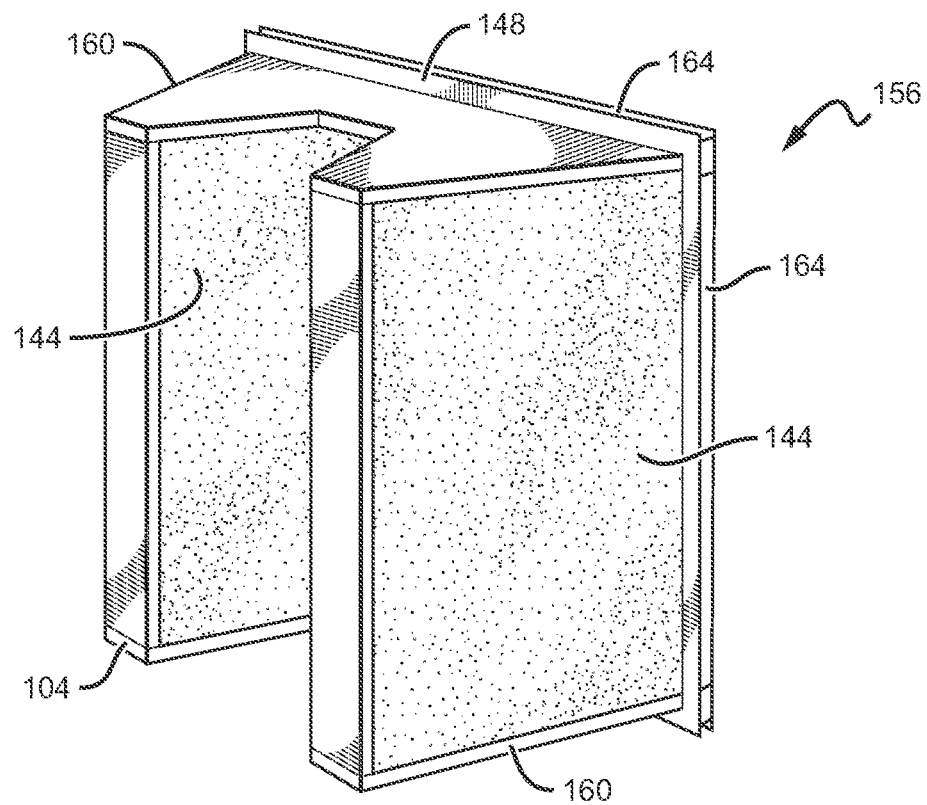
FIG. 4 illustrates an exemplary embodiment of a HVAC system air filter in accordance with the present disclosure.

The supportive frame 148 may comprise various fastening, or supportive, structures and materials suitably configured for securing the HVAC system air filter 104 within a particular HVAC system 108. To this end, in the embodiment illustrated in FIG. 3, the supportive frame 148 comprises a grate 152 configured to support the filter medium 144 within the HVAC system 108. In another exemplary embodiment 156, illustrated in FIG. 4, the supportive frame 148 comprises rigid end supports 160 and recesses 164 configured to orient the HVAC system air filter 104 within a particular make and model of HVAC system 108. As will be recognized, the supportive frame 148 illustrated in FIG. 4 has a very different shape than the shape of the supportive frame illustrated in FIG. 3. It should be understood, therefore, that the various structures, shapes, and materials incorporated into the supportive frame 148, and thus the HVAC system air filter 104 as a whole, will vary depending upon the particular HVAC system 108 for which the HVAC system air filter 104 is intended to be used without detracting from the spirit and scope of the present disclosure.

It will be appreciated that the filter medium 144 generally is retained within the supportive frame 148. It is contemplated that any of a variety of fasteners or structures may be implemented so as to retain the filter medium 144 within the supportive frame 148. In some embodiments, such as the embodiment of FIG. 3, the supportive frame 148 comprises the grate 152, or similar structure, which encloses the filter medium 144 within the supportive frame 148 without restricting airflow through the filter medium 144. In some embodiments, the supportive frame 148 comprises various structures, such as the rigid end supports 160 shown in FIG. 4, which are configured to retain and orient the filter medium 144 within the supportive frame 148. In some embodiments, the supportive frame 148 is molded directly onto the edges of the filter medium 144, thereby retaining the filter medium within the frame. In some embodiments, the supportive frame 148 may be molded to wire supports of the filter medium 144. For example, in some embodiments, the filter medium 144 is disposed between a first metal screen and a second metal screen, and the supportive frame 148 is molded onto the first and second metal screens so as to retain the filter medium 144 within the supportive frame. In some embodiments, the supportive frame 148 may comprise a crimped portion that folds onto and retains the metal screens and the filter medium 144 within the supportive frame. It will be appreciated that by those skilled in the art that fastening the filter medium 144 to the supportive frame 148 renders the filter medium 144 irremovable from the supportive frame 148. In some embodiments, however, the filter medium 144 may be removable from the supportive frame 148 without deviating from the scope of the present disclosure.

It is contemplated that a user of the HVAC system air filter 104 may periodically clean the filter medium 144 rather than replacing the HVAC system air filter 104, as is typically done with conventional air filter systems. It is envisioned that the HVAC system air filter 104 may be removed from the HVAC system 108, any trapped debris is then removed from the HVAC system 108, and then a water hose is used to flush contaminants from the filter medium 144, thereby leaving the filter clean and ready for reuse. In some embodiments, wherein the filter medium 144 comprises a filter oil composition, a solvent may be used to remove the filter oil from the filter medium 144. Once the filter medium 144 is completely dry, a suitably formulated filter oil composition may be uniformly applied and allowed to wick into the filter medium 144 and then the HVAC system air filter 104 may be reinstalled into the HVAC system 108. Various other cleaning methods will be apparent to those skilled in the art without deviating from the spirit and scope of the present disclosure.

The filter medium 144 preferably comprises at least a cotton gauze portion including 4 to 6 layers of cotton gauze sandwiched between two epoxy-coated aluminum wire screens. The cotton is advantageously treated with the above-mentioned suitably formulated filter oil composition for causing tackiness throughout microscopic strands comprising the filter medium 144. The nature of the cotton allows high volumes of airflow, and when combined with the tackiness of the filter oil composition creates a powerful filtering medium which ensures a high degree of air filtration.

During operation of the HVAC system 108, contaminant particles cling to the fibers within the volume of the filter medium 144 and become part of the filtering medium 144, a process referred to as "depth loading." It will be appreciated that depth loading allows the HVAC system air filter 104 to capture and retain significantly more contaminants per unit of area than conventional air filters. Contaminants collected on the surface of the HVAC system air filter 104 have little effect on air flow during much of the filter's service life because there are no small holes for the contaminants to clog. Contaminant particles are stopped by the layers of cotton gauze and held in suspension by the filter oil composition. Moreover, as the HVAC system air filter 104 collects an increasing volume of contaminants and debris, an additional form of filtering action begins to take place as the return air stream 124 first passes through the trapped contaminants on the surface of the filter medium 144 before passing through deeper layers within the filter medium 144. In essence, the trapped contaminants begin to operate as a filter material which precedes the filter medium 144. Thus, the HVAC system air filter 104 continues to exhibit a high degree of air flow and filtration throughout the service life of the filter, thereby reducing operating costs of the HVAC system 108.

As will be appreciated, treating the filter medium 144 with the filter oil composition generally enables the filter medium 144 to capture contaminants by way of interception, whereby contaminants, such as by way of non-limiting example, dirt particles, traveling with the return air stream 124 directly contact the fibers comprising the filter medium 144 and are then held in place by the filter oil composition. Larger or heavier particles are generally captured by way of impaction, whereby the inertia or momentum of the particles causes them to deviate from the path of the return air stream 124 through the filter medium 144, and instead the particles run straight into the fibers and are captured by the filter oil composition.

Particle contaminants having very small sizes may be captured by way of diffusion. As will be appreciated, small particles are highly affected by forces within the return air stream 124 through the filter medium 144. Forces due to velocity changes, pressure changes, and turbulence caused by other particles, as well as interaction with air molecules, generally causes the small particles to follow random, chaotic flow paths through the filter medium 144. Consequently, the small particles do not follow the return air stream 124, and their erratic motion causes them to collide with the fibers comprising the filter medium 144 and remain captured by the filter oil composition. Diffusion and the filter oil composition enable the HVAC system air filter 104 to capture particle contaminants having sizes that are much smaller than the openings between the fibers comprising the filter medium 144. Furthermore, the filter oil composition enables the HVAC system air filter 104 to capture contaminants throughout the volume of the filter medium 144, rather than only on the surface of the filter as is common with conventional air filters. The multiple layers of cotton fibers comprising the filter medium 144 coupled with the tackiness provided by the filter oil composition provide many levels of contaminant retention, thereby enabling the HVAC system air filter 104 to hold significantly more contaminants per unit of area of the filter medium 144 than is possible with conventional air filters.

As will be appreciated, the filter oil composition of the present disclosure is critical to the enhanced air flow and filtration properties of the HVAC system air filter 104. In some embodiments, the filter oil composition comprises an oil formulation which is non-reactive, has an excellent oxidation stability, possesses good thermal stability, and retains suitable viscosity at normal operating temperatures of the HVAC system 108. In some embodiments, the filter oil composition may be a mixture of oils and dyes (to provide color) suitable for enhancing the tackiness of the filter medium 144, such as by way of non-limiting example, paraffinic oils, polyalphaolefins, and the like. In some embodiments, the filter oil composition comprises a mixture of 96.74% paraffinic oil by volume, 3.20% polyalphaolefin (PAO) by volume, and 0.06% red dye by volume. In some embodiments, the filter oil composition has a viscosity at 100 degrees-C ranging between substantially 7.2 and 7.6 centistokes (cSTs). It is to be understood that the particular oils and dyes, as well as their colors or viscosities, and their individual concentrations within the filter oil composition may be altered without deviating from the spirit and the scope of the present disclosure.

Figure 5:
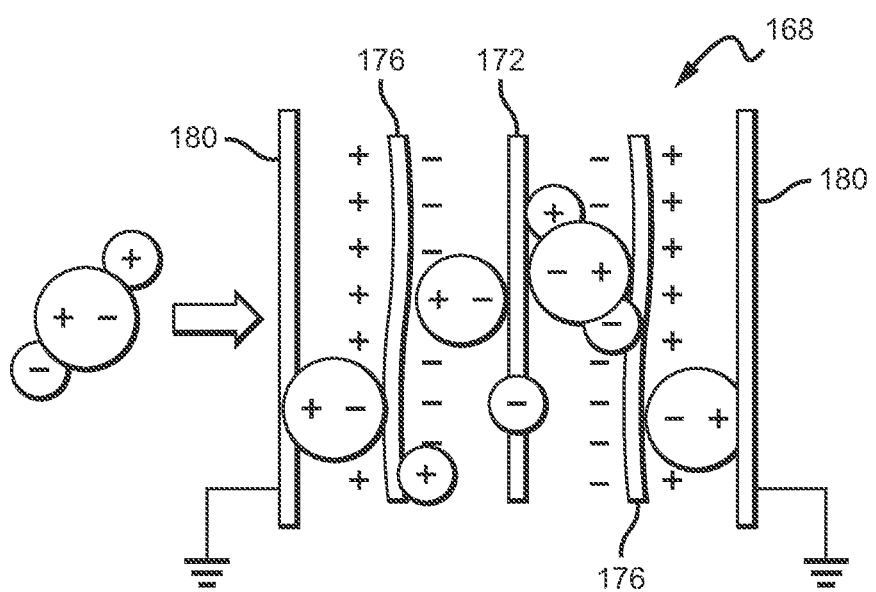
FIG. 5 illustrates a cross-sectional view of an exemplary embodiment of a portion of a composite filter medium configured for entrapping particle contaminants by way of electrostatic attraction and agglomeration.

In some embodiments, the layers of cotton gauze treated with the filter oil composition are coupled with portions of the filter medium 144 wherein other filtration mechanisms are used, thereby forming a composite filter medium 144 capable of removing airborne molecular contaminants and volatile organic compounds from the return air stream 124. In some embodiments, the composite filter medium 144 comprises a cotton gauze portion, as described herein, and an electrostatic portion. FIG. 5 illustrates a cross-sectional view of an electrostatic portion 168 of the composite filter medium 144 which is downstream of the cotton gauze layers and configured for utilizing electrostatic attraction and agglomeration to entrap particle contaminants. The embodiment of FIG. 5 is configured to entrap contaminant particles possessing diameters on the order of substantially 0.3 microns. The electrostatic portion 168 of the composite filter medium 144 comprises a central screen 172 configured to be electrically charged to a high electrostatic potential. In some embodiments, the central screen 172 is positively charged to substantially 7,000 VDC. The central screen 172 is covered on each side by at least one layer of fibers 176 capable of being electrically polarized. As shown in FIG. 5, each of the at least one layer of polarizable fibers 176 is covered by an exterior grounded wire screen 180. It will be appreciated that upon positively charging the central screen 172, the polarizable fibers 176 operate to polarize incoming particle contaminants within the return air stream 124, thereby causing the contaminants to become electrostatically attracted to the polarizable fibers 176. Thus, particle contaminants that would otherwise avoid directly colliding with the fibers 176 are electrostatically captured and entrapped within the filter medium 144.

FIG. 6 illustrates cross-sectional views of a polarized fiber 184 and an unpolarized passive fiber 188 being exposed to particle contaminants within an air stream 192 that flows from an upstream area 196 to a downstream area 200. As shown in FIG. 6, electrostatic attraction between the particle contaminants and the polarized fiber 184 uniformly distributes the contaminants on the surface of the polarized fiber 184. The electrostatic attraction ensures the capture of contaminants that would otherwise pass by the fiber 184 without a direct collision and continue flowing to the downstream area 200. Unlike the polarized fiber 184, the unpolarized passive fiber 188 relies upon direct collisions between the particle contaminants and the fiber, thus allowing non-colliding contaminants to continue flowing to the downstream area 200.

As further illustrated in FIG. 6, the contaminants that collide with the passive fiber 188 tend to accumulate on an upstream side of the passive fiber 188. It will be appreciated that as the accumulation of contaminants on the upstream side of the passive fiber 188 grows, the air stream 192 becomes proportionally restricted. Thus, filter mediums 144 comprising unpolarized passive fibers 188 are prone to clogging and greater loading than generally occurs with filter mediums 144 comprising polarized fibers 184. FIG. 7 illustrates a graph 204 showing an experimentally determined relationship between fine dust loading and a consequent drop in pressure across each of several air filter devices. FIG. 7 clearly demonstrates that filter media 144 comprising polarized fibers 184 entrap more contaminants with a lower pressure drop across the filter than is otherwise possible with conventional filter media comprising unpolarized passive fibers 188.

In some embodiments, at least some of the fibers comprising the composite filter medium 144 are treated with a coating of antimicrobial molecules configured to destroy microbes on contact. Preferably, the coating of antimicrobial molecules surrounds the entire circumference of each fiber strand that is treated. In some embodiments, the antimicrobial molecules comprise positively charged molecules that are configured to cooperate with the polarized fibers 176 of the composite filter medium 144. It is contemplated that since many microbes and volatile organic compounds are negatively charged, incorporating the antimicrobial molecules into the composite filter medium 144 will electrostatically capture the particle contaminants, thereby enabling the HVAC system air filter 104 to remove particles from the return air stream 124 as small as 0.001 microns in diameter, or smaller, such as many odors, irritants, toxic compounds, and the like.

In some embodiments, the fibrous materials comprising a portion of the composite filter medium 144 may comprise at least one substance configured to release a fragrance into air passing through the composite filter medium. Thus, in some embodiments, the HVAC system air filter 104 is configured to introduce a desired aroma into the building spaces 116. It is contemplated that various HVAC system air filters 104 may comprise different fragrances, thereby enabling a user to select an air filter 104 according to a desired aroma. In some embodiments, a particular scent or aroma may be distributed through the HVAC system 108 into the building spaces 116 so as to provide an aroma therapy by way of the HVAC system air filter 104.

In some embodiments, the substances configured to release a fragrance are incorporated into the composite filter medium 144 comprising the antimicrobial molecules. Thus, in some embodiments, the composite filter medium 144 utilizes treated cotton gauze and electrostatic attraction to entrap particle contaminants while simultaneously releasing an aroma into the building spaces 116. It will be appreciated, however, that the substances for releasing a fragrance preferably are located within the composite filter medium 144 downstream of the antimicrobial molecules so as to avoid destruction of aromatic molecules by the antimicrobial molecules.

It is contemplated that the fragrance may be any natural substance, synthetic material, (incorporating aldehydes, ketones, esters, and other chemical constituents), or combinations thereof which is known in the art and suitable for use in candles for imparting an odor, aroma, or fragrance. In some embodiments, suitable natural and synthetic fragrance/flavor substances may include those compiled by the U.S. Food and Drug Administration in Title 21 of the Code of Federal Regulations, Sections 172.510 and 172.515 respectively. In some embodiments, suitable fragrances may comprise spice oil, flower oil, fruit oil, and the like. In some embodiments, suitable fragrances may comprise fragrance components, such as for example benzaldehydes, phenols, cinnamic aldehydes and esters, octadienes, dienes, cyclohexadienes, terpenes, and the like. Further details regarding dispersion of aromas by way of air filters and fragrance compositions are disclosed in U.S. patent application Ser. No. 10/544,157, entitled "Vehicle cabin air filter freshener," filed on Aug. 13, 2003, the entirety of each of which is incorporated herein by reference.

It should be understood that the HVAC system air filter 104 is not limited solely to treating air within buildings and detached residential homes, but rather may be used for vehicle passenger cabins wherein passengers, drivers, as well as occupants reside, such as by way of non-limiting example, automobiles, trucks, recreational vehicles, buses, earthmoving equipment and tractors with enclosed cabins, crane operator cabins, various cargo moving vehicles, locomotives, rail passenger cars, airplanes, helicopters, ship cabins, airship cabins, and the like. Moreover, the HVAC system air filter 104 may be incorporated into HVAC systems other than as illustrated in FIG. 1, such as by way of non-limiting example, central HVAC systems, rooftop HVAC systems, wall-mounted HVAC systems, as well as portable HVAC systems, and the like.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A reusable air filter for building spaces, comprising:
   a filter medium for filtering air within a building wherein the filter medium includes a cotton gauze portion and an electrostatic portion;
   a frame for supporting the filter medium; and
   a filter oil composition for causing tackiness of the filter medium.

2. The reusable air filter of claim 1, wherein the frame includes a shape and a size for orienting the filter medium within an HVAC system of the building.

3. The reusable air filter of claim 1, wherein the filter medium is configured to remove the airborne molecular contaminants and volatile organic compounds from the air.

4. The reusable air filter of claim 1, wherein the filter oil composition comprises any one or more of paraffinic oil, polyalphaolefin, and a dye.

5. The reusable air filter of claim 1, wherein the filter medium includes at least one substance configured to release a fragrance into the air.

6. The reusable air filter of claim 1, wherein the electrostatic portion is configured to attract and agglomerate particle contaminants from the air.

7. The reusable air filter of claim 1, wherein the electrostatic portion includes a central screen covered on each side by at least one layer of polarizable fibers.

8. The reusable air filter of claim 1, wherein the electrostatic portion comprises fibers that are treated with a coating of antimicrobial molecules configured to destroy microbes.

9. The reusable air filter of claim 1, wherein the cotton gauze portion includes at least one layer of cotton gauze disposed between two wire screens.

10. The reusable air filter of claim 9, wherein the at least one layer of cotton gauze is configured to be treated with the filter oil composition.

11. The reusable air filter of claim 10, wherein the filter oil composition is configured to wick into the at least one layer of cotton gauze.

12. The reusable air filter of claim 10, wherein the at least one layer of cotton gauze is configured to be flushed free of the filter oil composition and contaminants.

13. The reusable air filter of claim 12, wherein the filter oil composition is configured to be washed from the filter medium.

14. The reusable air filter of claim 13, wherein the filter oil composition is configured to be flushed from the filter medium along with entrapped contaminants by way of a solvent and water.

15. The reusable air filter of claim 1, wherein the filter oil composition comprises a mixture for causing tackiness of the filter medium.

16. The reusable air filter of claim 15, wherein the mixture comprises any two or more of paraffinic oil, polyalphaolefin, and a dye.

17. The reusable air filter of claim 16, wherein the mixture comprises about 96.74% paraffinic oil, by volume, about 3.20% polyalphaolefin, by volume, and about 0.06% red dye, by volume.

18. The reusable air filter of claim 1, wherein the filter oil composition is configured to capture particle contaminants having sizes that are much smaller than the openings between fibers comprising the filter medium.

19. The reusable air filter of claim 18, wherein the filter oil composition is configured to capture contaminants throughout the volume of the filter medium.

* * * * *